Patented July 22, 1930

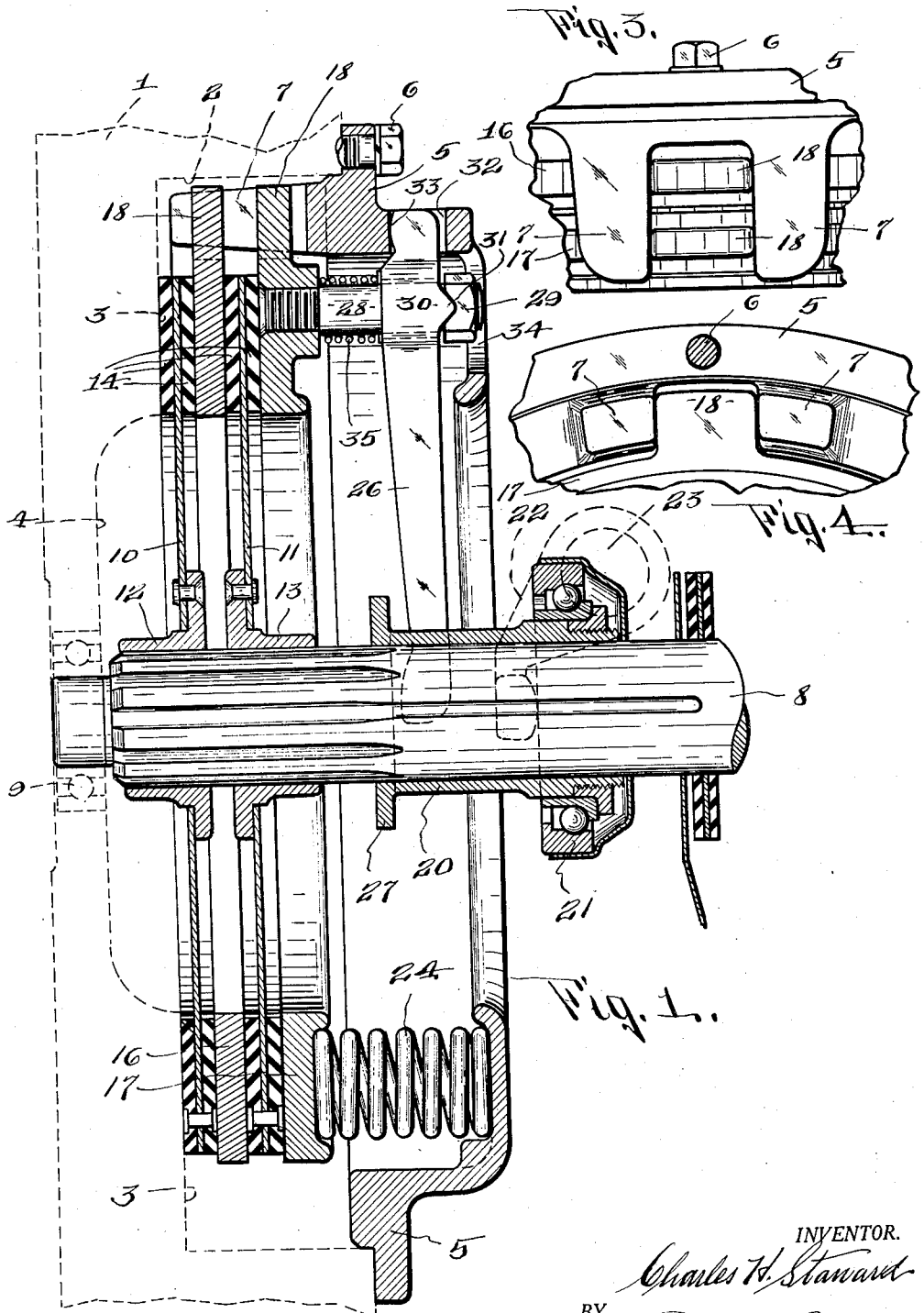

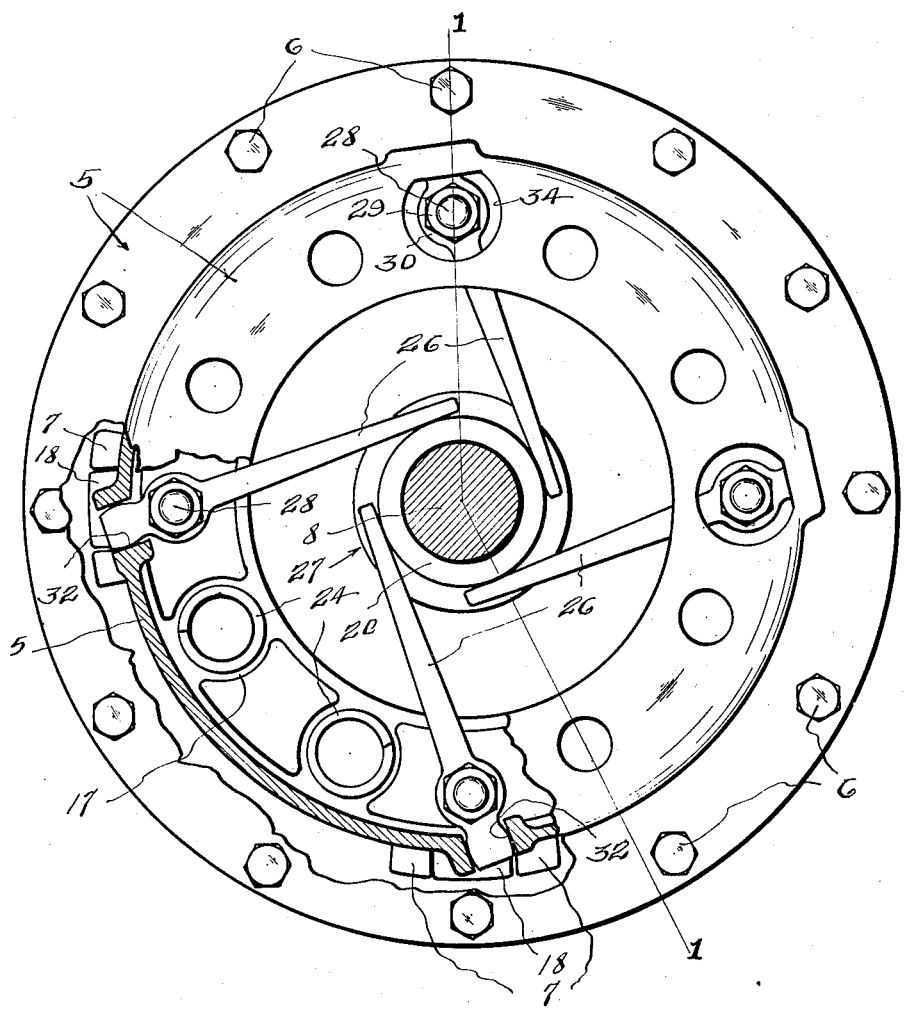

1,770,952

UNITED STATES PATENT OFFICE

CHARLES H. STANARD, OF SYRACUSE, NEW YORK, ASSIGNOR TO BROWN-LIPE GEAR COMPANY, OF SYRACUSE, NEW YORK, A CORPORATION OF NEW YORK

CLUTCH

Application filed April 12, 1928. Serial No. 269,495.

This invention has for its object, a particularly simple and efficient friction clutch by which comparatively heavy springs can be employed to engage the clutch with a comparatively small area of friction surface and further, by which the clutch can be disengaged against the action of the springs with minimum effort.

It further has for its object, a powerful clutch which consists of a few compactly arranged parts.

The invention consists in the novel features and in the combinations and constructions hereinafter set forth and claimed.

In describing this invention, reference is had to the accompanying drawings, in which like characters designate corresponding parts in all the views.

Figure 1 is a vertical sectional view of this clutch.

Figure 2 is a rear elevation, partly broken away and partly in section.

Figure 3 is an enlarged fragmentary plan view.

Figure 4 is an enlarged elevation of parts seen in Figure 3.

1 designates the driving member of the clutch which is usually the fly wheel of an engine, the fly wheel being formed with a recess 2 having a comparatively flat annular raised pressure face 3. That is, the face 3 is raised relatively to the bottom 4 of the central portion of the recess.

The driving member further includes a back plate 5 having an annular flange secured to the rear face of the fly wheel as by screws 6, the back plate having portions as forks 7 extending at intervals into the recess.

The driven member of the clutch comprises a shaft 8 having a pilot bearing 9 in the driving member and friction means as disks or plates 10 and 11 having hubs 12, 13 mounted on the shaft to rotate therewith and shift axially thereof.

The hubs extend in opposite directions and the hub 12 of the innermost disk 10 extends into the deeper portion of the recess 2 toward the bottom 4, or in other words, the hub 12 extends beyond the plane of the pressure face 3. Each of the disks 10 and 11 have friction facing rings 14 on opposite sides of their outer margins.

16 and 17 are pressure rings having radial tongues 18 interlocked with the portions or forks 7 of the back plate, these rings being of metal and relatively thick.

20 designates the throw-out sleeve slidable axially of the shaft 8 and having a throw-out bearing 21 at its rear end with which coacts a yoke 22 mounted on the shaft 23 operated by the clutch pedal.

24 is one of a plurality of springs arranged in annular series and interposed between the back plate and the pressure ring 17. These springs are as heavy as desired, to hold the comparatively small friction faces of the pressure rings 16 and 17 is engagement with the disks 10 and 11 and to hold the disk 10 engaged with the pressure face 3 of the driving member.

26 are motion transmitting and multiplying levers between the throw-out sleeve 20 and the pressure ring 17, these levers bearing at their inner ends against a flange 27 on the inner end of the throw-out sleeve 20 and fulcruming at their outer ends on the back plate and coacting with the pressure plate 17 near their outer ends.

As here illustrated, the pressure ring 17 is provided with a plurality of rearward projections or rods 28 having adjustable shoulders as nuts 29 at their rear ends, and the levers are formed with yoke portions 30 through which the rods extend. The yoke portions have points 31 bearing on the nuts 29. The nuts are usually provided with depressions for receiving the points 31 in order that the nuts will be held in their adjusted positions by the points. The outer fulcrumed ends of the levers extend into radially extending openings 32 in the back plate and fulcrum at 33 on the walls of said openings. Suitable openings 34 are provided in the back plate for the insertion of a tool to adjust the nuts 29.

In order to take up looseness and avoid rattling, springs 35 are interposed between the pressure ring 17 and the yoke portions 30 of the levers 26, these springs encircling the rods 28.

Upon operation of the clutch pedal which actuates the shaft 23, the throw-out sleeve 20 will be moved to the right against the action of the powerful springs 24 thus withdrawing the pressure plate 17 and permitting the clutch to disengage.

Owing to the pressure rings 16 and 17 and the levers, comparatively powerful springs can be employed with a small friction area, and owing to the raised pressure face 3 and the flat disks or plates 10 and 11 with the hub of the innermost extending into the deeper central portion of the recess in the driving member, the clutch is particularly compact or short and owing to the removable back plate with which the pressure rings are interlocked, the portions of the clutch to be applied to the fly wheel is made up as a unitary structure with the driven member and throw-out mechanism of the clutch.

What I claim is:

1. A clutch comprising driving and driven members, the driving member being provided with a recess having a raised annular pressure face therein, a back plate having a portion extending into the recess, the driven member comprising a shaft arranged coaxially with the driving member provided with a pilot bearing therein, a pair of flat friction disks having hubs slidably mounted on and rotatable with the shaft, the hubs extending in opposite directions and the hub for the inner disk extending into the recess beyond the plane of said pressure face and the inner disk coacting with said pressure face, pressure rings interlocked with said portion of the back plate, one of said pressure rings being interleaved with the friction disks and the other pressing against the outer face of the outer friction disk, a throw-out sleeve slidable axially of the shaft, motion transmitting levers between the throw-out sleeve and the outermost pressure ring, the levers being fulcrumed at their outer ends to the back plate coacting with the outer pressure ring near the outer ends of the levers, and springs between the back plate and the outer pressure ring.

2. A clutch comprising driving and driven members, the driving member being provided with a recess having an annular bottom pressure face, a back plate secured to the driving member and having a portion extending into the recess adjacent the circumferential wall thereof, the driven member comprising a shaft arranged coaxially with the driving member and having a pilot bearing therein, a flat friction disk having a hub slidably mounted on and rotatable with the shaft, said disk coacting with said bottom pressure face, a pressure ring located in the recess and interlocked with the portion of the back plate extending into the recess, a throw out sleeve slidable axially of the shaft, motion transmitting levers between the throw out sleeve and the pressure ring, the levers being fulcrumed at their outer ends in the back plate outside of the recess, the back plate having an annular flange lapping the rear face of the driving member outside of the recess and secured thereto and the pressure ring being provided with studs extending rearwardly therefrom and having shoulders at their rear ends, the levers thrusting against the inner sides of the said shoulders and springs interposed between the back plate and the pressure ring.

In testimony whereof, I have hereunto signed my name, at Syracuse, in the county of Onondaga and State of New York, this 10th day of April, 1928.

CHARLES H. STANARD.